E. R. GILL.
SIGNALING SYSTEM.
APPLICATION FILED AUG. 16, 1913.
Reissued Sept. 1, 1914.
13,795.
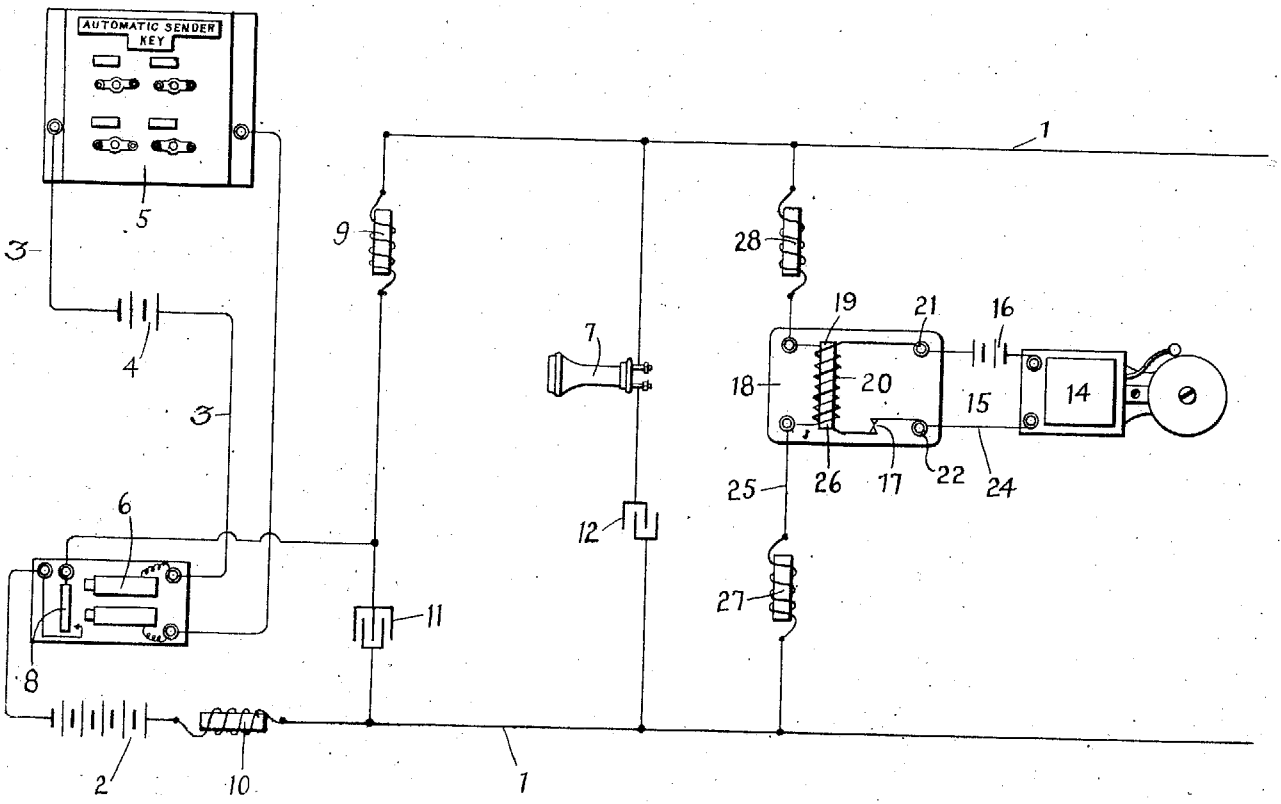
WITNESSES
Merton A. Burgess.
Sidney Martin.
INVENTOR,
Edwin R. Gill,
BY
Kenyon & Kenyon,
his ATTORNEYS.

UNITED STATES PATENT OFFICE.

EDWIN R. GILL, OF YONKERS, NEW YORK, ASSIGNOR, BY MESNE ASSIGNMENTS, TO HALL SWITCH & SIGNAL COMPANY, A CORPORATION OF MAINE.

SIGNALING SYSTEM.

13,795. Specification of Reissued Letters Patent. Reissued Sept. 1, 1914.

Original No. 1,019,781, dated March 12, 1912, Serial No. 483,314. Application for reissue filed August 16, 1913. Serial No. 785,172.

*To all whom it may concern:*

Be it known that I, EDWIN R. GILL, a citizen of the United States, and a resident of Yonkers, in the county of Westchester and State of New York, whose post-office address is Yonkers, New York, have invented certain new and useful Improvements in Signaling Systems, of which the following is a specification.

This invention relates to signaling systems, and more particularly to such systems as are adapted for railroad train despatching. One of the objects thereof is to provide means whereby undesirable interference with an instrument such as a telephone, due to the impressing on the line of a current from a source thereof, may be reduced to a minimum.

Another object is to provide for impression upon the line of signaling impulses, without interference with the normal operation of the telephonic instruments, or vice versa.

A further object is to modify the rise and fall of battery current impressed upon the line to actuate a signaling device, of an induced current impressed upon the line by the operation of the signaling device, whereby interference with speaking currents on the line is prevented.

Further objects will be in part obvious, and in part specifically adverted to in the course of the following specification.

In the accompanying drawing, which is to be taken as a part of this specification, and in which I have shown schematically a merely preferred form of embodiment of the invention, the figure represents a telephone line, having included therein selectively operated signaling devices, together with types of the adjuncts essential to the successful achievement of the objects premised.

Referring now to the drawing, the line is indicated at 1, and 2 represents a for impressing current thereon, 3 indicates a local circuit, including a battery 4, and, in the present instance, also including a sender key device 5 which, when operated, operates a relay 6, thereby effecting the closing of the main line circuit. In order to provide means whereby the battery may be applied to or withdrawn from the line in such manner that no audible effect is produced upon the telephone 7, connected in bridge of the line, I employ devices for slowing down the rate at which the battery currents rise and fall, such devices comprising inductive resistance or retard coils. One of these impedances is inserted between the armature 8 of the relay and the line, and a second impedance 10 is located between the battery and the line. This second coil, because of the location, protects the battery in case of accident, from short circuit. A condenser 11 is placed between the armature 8 of the relay and one side of the line and a condenser 12 is located in the bridge of the telephone 7.

The signaling instrument employed in the present system comprises an electric bell 14, included in a local circuit 15, having a battery 16, said circuit adapted to be closed by a circuit closer 17.

In the present embodiment of my invention, the operation of circuit closer 17 is selectively determined by means connected in bridge of the line, through the instrumentality of sender key 5 and relay 6. The selector is shown at 18, and although various types of instruments adopted for this purpose may be used, I preferably employ an instrument of the kind disclosed in Letters Patent No. 906,523, granted to me December 15, 1908. This selector includes a magnet 19 and a coil 20 on said magnet, the latter being connected at 21 with a battery terminal and with the circuit closer 17, which coöperates with a bell contact 22 to close the ringing circuit 24. The operative circuit 25 of the main line includes a coil 26 on magnet 19, and in the present instance coils 20 and 26 are distinguished from each other by the use of heavy and light lines to designate them respectively. Retard coils 27 and 28 are arranged in series between the terminal of the selector and the line.

Having thus described my improved signaling system, the operation thereof may now be understood. When the relay 6 is operated, the battery 2 begins to charge the condensers, the potential between the armature of the relay and the line rising slowly, while the impedance in the line circuit tends to still further reduce the rate of current increase. Accordingly since the current rises and falls very slowly, the portion thereof which passes through the telephone apparatus, does not interfere with the normal operation of the latter. The battery circuit, therefore, may be worked simultaneously upon the line so as to operate a device, such as the selector shown herein, without the telephone or said selector interfering with each other's operation. When the ringing circuit 24 is closed by the operation of the selector, the interrupted current set up in said circuit by the vibration of the bell armature, passing through the coil 20, which acts as a primary, coöperates with the magnet to set up an induced current in the main line, which current, acting upon the telephone apparatus connected in bridge of the line, might interfere with the voice currents transmitted to or from such apparatus; but such interference is minimized by the insertion of the impedance in the bridge of the selector circuit. The impedance also insures that the operation of the selector mechanism shall not be anywise affected by the voice currents.

It will be apparent that by the use of the system described audible annoyances and undesirable interference ordinarily caused by battery or current changes are overcome, permitting the simultaneous operation of telephonic apparatus and the signal devices over a single line, in an entirely efficient manner. It will also be apparent that the provision of the impedance serves to protect the various instruments from lightning.

As many changes could be made in the above system, and many apparently widely different embodiments of this invention could be made without departing from the scope thereof, it is intended that all matter contained in the above description or shown in the accompanying drawings shall be taken as illustrative, and not in a limiting sense.

Having thus described my invention, what I claim as new and desire to secure by Letters Patent, is:—

1. A system adapted for the simultaneous operation of message receiving instruments and selective signaling devices, comprising parallel lines, impedance in series with said lines, a protective short circuit across said lines comprising suitably proportioned capacity and inductance in series, message receiving instruments in bridge of said lines, a condenser in said bridge, selective signaling devices in bridge of said lines, and impedance in said last bridge.

2. A system adapted for the simultaneous operation of message receiving instruments and selective signaling devices, comprising parallel lines, impedance in series with said lines, condensance in bridge of said lines, message receiving instruments in bridge of said lines, condensance in said bridge, selective signaling devices in bridge of said lines, and impedance in said last bridge disposed between said selective device and each of said lines.

3. A system adapted for the simultaneous operation of message receiving instruments and selective signaling devices, comprising parallel lines, impedance in series with said lines, condensance in bridge thereof, a message receiving instrument in bridge of said lines, a condenser in said bridge, an inductive selector in bridge of said lines, and a local circuit including a signal adapted to be controlled by said selector.

4. A system adapted for the simultaneous operation of message receiving instruments and selective signaling devices, comprising parallel lines, impedance in series with said lines, condensance in bridge thereof, a message receiving instrument in bridge of said lines, condensance in said bridge, an inductive selector in bridge of said lines, impedance in said bridge and arranged between said selector and each of said lines, and a local circuit including an alarm device controlled by said selector.

5. In a system adapted for the simultaneous operation of telephones and selective signaling device, in combination, a circuit comprising parallel lines, means for impressing current on said lines, a key operated relay for controlling the impression of current upon said lines, a telephone in bridge of said lines, condensance in said bridge, an inductive selector in bridge of said lines, impedance in said bridge, a local signal comprising an alarm device, and a circuit for the local signal controlled by said selector.

6. In a signaling system of the class described, in combination, a line comprising metallic sides, a selector in bridge, of said lines impedance in said bridge, a local circuit comprising a local signal adapted to be closed by selector, telephone apparatus in bridge of said line, a condenser in said bridge, a battery, a relay for applying said battery to the line, and impedance located between the battery and the line.

7. In a system adapted for the simultaneous operation of telephones and selective signaling device, in combination, a circuit comprising parallel lines, means for impressing current on said lines, a key operated relay for controlling the impression of current upon said lines, a plurality of impedance devices in series with said lines, a condenser in bridge thereof, a telephone in bridge with said lines, a condenser in said bridge, an inductive selector in bridge of said lines, impedance in said bridge, a local signal comprising an alarm device, and a circuit for the local signal controlled by said selector.

8. In a system adapted for the simultaneous operation of telephone and selective signaling devices in combination, a circuit comprising parallel lines, means for impressing current on said lines, a key operated relay for controlling the impression of current upon said lines, a plurality of impedance devices in series with said lines, a condenser in bridge thereof, a telephone in bridge of said lines, a condenser in said bridge, an inductive selector in bridge of said lines, a plurality of impedance devices in said last bridge one of said devices being located between each of terminals of the selective device and one of said lines, a local circuit, and an alarm in said local circuit, the operation of which is determined by the opening and closing of said local circuit by said selector.

9. In a selective signaling system the combination of a line uniting a calling station and a plurality of called stations, a signal at each called station including means to give an answer-back signal to the calling station over said line by varying the potential on said line, telephones on said line, a selector controlling said signals in response to calling impulse impressed on said line, means for impressing abrupt calling impulses on said line and means for modifying the nature of the calling impulses and the answer-back variations whereby telephonic communication over said line may be had while a call, including an answer-back, is being sent over the same circuit without substantial interference.

10. In a selective signaling system, the combination of a line uniting a calling station and a plurality of called stations, an electro-magnetic signal at each called station including means to give an answer-back signal to the calling station over said line by rapidly and abruptly varying the electrical condition of said line, telephones across said line, a selector at each called station controlling the signal thereat in response to calling impulses impressed upon said line, means for impressing abrupt calling impulses on said line, means modifying the nature of the calling impulses and the effect of the answer-back signal on the line, whereby telephone communication may be had while a call, including an answer-back signal, is being sent over the same circuit without substantial interference.

11. In a selective signaling system, the combination of a line uniting a calling station and a plurality of called stations, an electro-magnetic signal at each called station including means to give an answer-back signal to the calling station over said line by rapidly and abruptly varying the potential of said line, telephones connected across said line, a selector at each called station controlling the signal thereat in response to calling impulses impressed on said line, means for impressing said impulses on said line and impedance and capacity on said line, whereby the abrupt calling impulses and the abrupt potential changes on the line caused by the signal during the answer-back are so modified that telephonic communication may be had while a call, including the answer-back signal, is being sent over the same circuit without substantial interference.

12. In a selective signaling system the combination of a line uniting a calling station and a plurality of called stations, a signal at each called station including means to give an answer-back signal to the calling station over said line by initiating rapid abrupt impulses on said line, telephones across said line, a selector connected to said line at each called station controlling the signal thereat in response to specific impulses impressed on said line, means at the calling station for initiating abrupt calling impulses on said line, and means at the calling and called stations for modifying said calling and answer-back impulses so that telephonic communication may be had while a call, including an answer-back, is being sent over the same circuit without uncomfortable interference.

13. In a selective signaling system the combination of a line uniting a calling station and a plurality of called stations, a signal at each called station including means to give an answer-back signal to the calling station over said line by initiating rapid abrupt impulses on said line, telephones across said line, a selector connected to said line at each called station controlling the signal thereat in response to specific impulses impressed on said line, means at the calling station for initiating abrupt calling impulses on said line and impedance at the calling station and at the called stations, and condensance common to both impedances whereby conversation may be had while a call including an answer-back is being sent over the same circuit without uncomfortable interference.

14. In a selective signaling system, the combination of a line uniting a calling station and a plurality of called stations, means at the calling station for initiating abrupt calling impulses on said line, a signal at the called station responsive to said impulses and including means to initiate rapid abrupt answer-back impulses on said line while responding to said calling impulses, telephones across said line, impedance in the line at the calling station and impedance in bridge of the line at the called station, and condensance in bridge of said line, whereby the character of the calling and answer-back impulses is so modified that conversation may be had while a call, including an answer-back, is being sent over the same circuit without uncomfortable interference.

In testimony whereof, I have signed my name to this specification, in the presence of two subscribing witnesses.

EDWIN R. GILL.

Witnesses:

NEWTON A. BURGESS,
EDWIN SEGER.